April 26, 1966  M. B. SENNET  3,247,580
METHOD OF MAKING SCREW PUMPS
Filed May 9, 1962
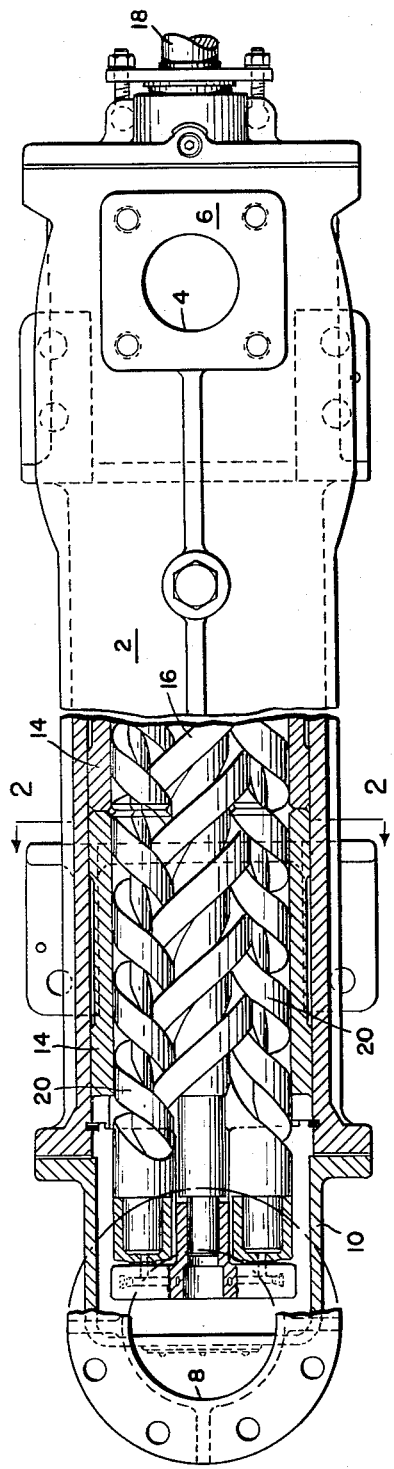
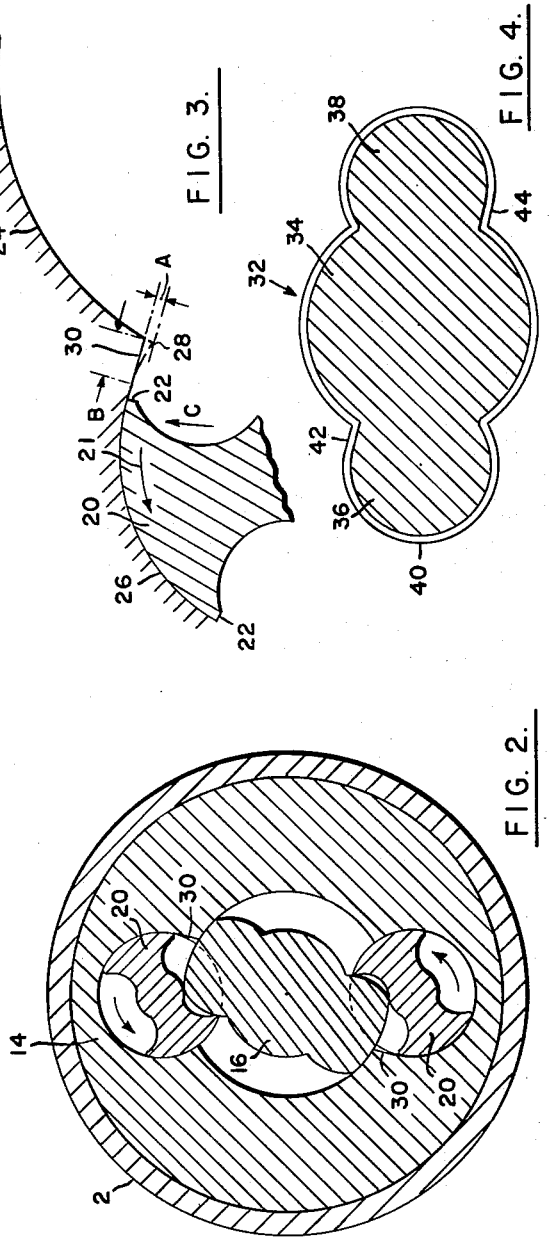
INVENTOR.
MORGAN B. SENNET
BY
ATTORNEYS 3,247,580
METHOD OF MAKING SCREW PUMPS
Morgan B. Sennet, Erwinna, Pa., assignor, by mesne assignments, to De Laval Turbine Inc., Trenton, N.J., a corporation of Delaware
Filed May 9, 1962, Ser. No. 193,507
5 Claims. (Cl. 29—156.4)

This invention relates to screw pumps and methods of making the same and has particular reference to the provision of pumps having very close running clearances.

The present invention is particularly applicable to both positive and non-positive screw pumps of the types described in the Montelius Patents 1,698,802, 1,821,523 and 1,965,557, dated, respectively, January 15, 1929, September 1, 1931 and July 3, 1934, and Sennet Patents 2,693,762 and 2,693,763, dated November 9, 1954. It will be evident, that the invention is, however, also applicable to other types of screw pumps in connection with which generally similar problems arise.

Attention may be particularly directed to the pump construction, applicable to all of the above types, shown in Sennet Patents 2,924,181. In accordance with the last patent, pumps having intermeshing screws have their idlers formed in sections arranged end to end, and also have the housings for the screws provided in sections arranged end to end, generally corresponding in length to the idler screw sections which they enclose. The advantages of this construction are brought out in that patent and need not be discussed in detail, beyond mentioned that by the formation of the idler screws and the housing in sections self-alignment of the parts may occur for smooth operation, and pumps of various lengths and consequently varying numbers of closures may be provided by assembling different aggregates of manufactured parts. While the present invention is of broader applicability to screw pumps of the types disclosed in all of the aforementioned and other patents, as will be evident hereinafter, the pumps made in accordance with said Patent 2,924,181 raise particular problems and consequently the invention will be described specifically with respect to such pumps.

When short idler sections are used, if ordinary adequate running clearances are provided between them and their housing sections they are permitted slight angular deviations transverse to their axes. To prevent such deviations very close clearances are desirably provided. This means that adequate lubrications becomes difficult particularly in view of the fact that, as desirably constructed, the idlers present quite extended cylindrical areas to their housnig bores. Furthermore, as the screws revolve the edges of the idler threads present to the bearing surfaces of the bores relatively "sharp" edges which have a tendency to wipe lubricant (the liquid being pumped) from the cylindrical surfaces of the bores. As is well known, the edges of the idlers are desirably provided with lands, usually substantially radial flats, to secure smooth running and minimize wear in their engagements with the threads of the power screw. Furthermore, the longitudinally extending intersection lines of the bore lobes have been sharp, producing a wiping action tending to remove lubricant from the cylindrical idler surfaces.

In accordance with the present invention, a wedge action is provided to promote the entry of the pumped liquid into the running clearance between the cylindrical surfaces thereby to promote adequate lubrication. Furthermore, the entrance of the liquid into the wedge is from the high pressure side of the screws resulting in more adequate lubricating action. Briefly this end is achieved by cutting away portions of the theoretical intersecting edges of the several lobes of the bores in proper fashion.

The accomplishment of the last mentioned results would be attended with some difficulties if the usual methods of manufacture of the housings were adopted.

Heretofore, the multilobed bores in the housings have generally been produced by multiple boring followed by lapping to secure accurate dimensions. As the following description proceeds, it will become evident that the desirable wedges could be accurately produced only with considerable difficulty.

But in accordance with the invention there may be consistently produced not only extremely accurate bores but very readily desirable closely dimensioned wedges. Briefly stated, the desired result is secured by a broaching procedure in which a broach having multiple lobes may be drawn through openings in the housings to remove metal and produce to an extremely high degree of accuracy bores not only properly dimensioned but having their axes very accurately related to provide the necessary alignment for very smooth running with very small clearance. From the manufacturing standpoint, furthermore, the method of producing the housings is very advantageous in that by using long broaches considerable amounts of metal may be easily removed to produce final results so that instead of any preliminary boring the housings may be made by extrusion with the approximate bores formed thereby. A long extrusion may be then cut into sections of desirable lengths and these singly, or more desirably assembled, may be broached in a single operation to provide the final product. The various objects of the invention have to do with the attainment of the foregoing results, and these and more detailed objects will become more apparent from the following description, read in conjunction with the accompanying drawing, in which:

FIGURE 1 illustrates, partly in section, a typical screw pump to which the invention is applicable;

FIGURE 2 is a transverse section taken on the plane indicated at 2—2 in FIGURE 1;

FIGURE 3 is an enlarged diagrammatic section showing, in particular, the nature of the lubricant wedge-forming arrangement with respect to the screws; and FIGURE 4 is a transverse section through a broach used to finish the intersecting bore arrangement of a housing.

FIGURE 1 corresponds essentially to what is illustrated in FIGURE 2 of Patent 2,924,181. The major portion of a pump casing is indicated at 2, the length of which casing varies with the length of the pump. The casing 2 is provided with the outlet passage 4 having a plane face 6 to which pipe connections may be bolted with suitable sealing. To the left-hand end of the casing 2 there is bolted a cast cover 10 provided with an inlet passage 8.

Housing members are indicated at 14 and except possibly for end members may be duplicates or substantial duplicates of each other providing the lobed bores for the reception of the screws. These housing members are prevented from rotating and are limited against endwise movement as disclosed in said patent. The usual thrust bearings are provided as more fully disclosed in said patent.

The centrally located power screw 16 has a driving shaft extension 18. The idlers are shown at 20, and for the positive pump illustrated there are two sets of these, each idler having two threads if the power screw also has two threads, all as shown. In the case of a non-positive pump there may be additional idlers or the screws may have different arrangements of threads as illustrated in various of the patents heretofore referred to. As will become apparent the invention is very broadly applicable to many arrangements of screws having various numbers of threads. Generally speaking, however, the invention has special advantages in the case of positive screw pumps where extremely high pressures are encountered and mechanical forces are correspondingly large.

The idler sections may correspond in number with the housing members and as shown, they may abut each other at the junctions of the housing members. They engage each other at their ends but need not be connected to be driven together inasmuch as they mate with the power screw and are so angularly located by it that their threads are continuous with those of adjacent idlers.

The matters so far discussed represent conventional aspects of a pump of this type. Attention may now be given to FIGURE 3 which is illustrative of the matters with which the invention is concerned. In that figure the section of an idler is indicated at 20 and the thread shown is provided with the lands 22, somewhat exaggerated in radial extent, which are generally radial in extent with some rounding in certain instances. Let it be assumed first, that the operation of the pump is unidirectional so that the illustrated idler rotates as indicated by the arrow 21. The power screw bore is shown at 24, the power screw being omitted from this figure, while one of the idler bores is indicated at 26. As these pumps have been constructed, the cylindrical bores have had intersections along sharp axially extending edges as indicated at 28. Considering rotation, it will be evident that if the advancing land 22 engaged and passed the sharp edge 28 there would be a considerable wiping action tending to remove the lubricant (the pumped liquid) from the cylindrical surface of the idler, with the idler in turn tending to have its land wipe the lubricant from the cylindrical surface of bore 26. Such wiping actions are particularly accentuated by reason of the fact that in operation as indicated the idler 20 is forced tightly against its bore in the direction indicated by the vector C, so that pressure and wiping action cooperate very detrimentally to prevent proper film formation and lubrication. In accordance with the present invention, the intersection edges are cut away as indicated at 30. While the surface 30 need not necessarily be plane, it may, for convenience of description, be considered so with the result that where the idler bore 26 meets the power bore 24 there is a plane strip surface tangent to the cylindrical surface of the idler bore extending the length of the housing. The amount of the housing which may thus be considered cut away is actually very small consistent with producing a highly effective wedge action. Typically for one inch diameter idlers the dimension indicated at A may be of the order of 0.004 inch, with the width of the plane portion B of the order of ⅛ inch, the latter dimension being relatively immaterial since a narrow wedge is produced whether the surface 30 is plane or slightly curved, so long as it meets the idler bore substantially tangentially.

The effective action will now be apparent. Instead of the land's now having an effective shearing action with an edge such as 28, there is substantial clearance, as just stated, within which the liquid may enter. Due to the drag of the idler, which generally rotates at high speed, this liquid is dragged toward the narrow portion of the wedge space and consequently into the region between the idler and its bore beyond the apex of the wedge. Furthermore, as will be evident from considering FIGURE 1 in conjunction with FIGURE 3, the liquid which is thus entering the wedge and becomes squeezed between the idler and its bore is on the pressure or delivery side of the threads so that the discharge pressure produces a gradient tending to increase the entry of the liquid into the wedge and between the mating surfaces.

It may be further noted that this wedging action is not confined merely to the helical land edge of the idler thread. As the idler rotates its entire cylindrical surface as it passes the intersection region will form the wedge configuration, so that the liquid is uniformly distributed throughout the entire length of each idler section. This is in contrast with what has been heretofore used, namely a wedging action produced by slightly cutting away the cylindrical portions at the leading edges of the idler threads. It is true that this produces a wedging action and avoids shearing relationship between an edge such as 28 and the leading lands 22; but consideration of what occurs will readily reveal that this is essentially all that can occur so that the enhancement of lubrication is confined largely merely to the region adjacent the leading land edges of the threads. There is also some interference by the power screw of the entrance of the liquid into such a wedge.

If the pump is designed for unidirectional operation, the wedge-providing surfaces 30 need only be located along the bore intersections at which the leading edges of the idler threads are entering the idler bores. Thus, in the pump illustrated the surface 30 would only need to be repeated at the edge diametrically opposite that shown. However, if the pump is designed for reversal of operation, all of the bore intersections would be formed in accordance with the above.

The provision of the wedge region described would theoretically have a detrimental effect on the completeness of closure of the traveling chambers formed by the threads and the housing. Actually, however, the dimensions of such a wedge are so small that the detrimental effect is completely negligible, particularly when it is considered that pumps of this type have their screws generally rotating at quite high speeds. The gain in effective lubrication and the fact that by reason of this the radial clearances may be made very small thoroughly compensates for any loss which may occur.

The achievement of the bore contours as just described would obviously be difficult in accordance with the manufacturing procedures heretofore used involving boring followed by lapping or other procedure to secure dimensional accuracy. The departure from cylindrical contours of the bores by reason of the production of the relatively flattened surfaces at 30 would require some shaving or similar operation, entailing difficulties because of the desirability of removing only quite small amounts of material. A further aspect of the invention, therefore, relates to a novel procedure for producing the housing bores, and has outstanding advantages even beyond the aspect of producing the wedge-forming surfaces. In accordance with the invention the bores are finished by broaching. In preparation for the broaching operation, the housings may be bored in the fashion heretofore practiced, the bores being bored to diameters close to the final dimensions but such as to permit broaching in accordance with conventional practices with respect to material to be removed. However, as contrasted with boring followed by lapping or similar finishing operations, broaching may be used to remove substantial amounts of metal, and accordingly it becomes possible, with major advantagest in lessening costs, to form the housings from relatively roughly bored or even from extruded metal lengths, using the extruding procedure to provide the rough initial bores. Housing sections may then be transversely cut from the extruded bar. Following the rough formation of housing sections, they may be individually broached, or, if they are to be used in combination end to end they are desirable assembled and then simultaneously broached to insure very accurate alignment of the bores.

The broach used for the finishing operation is illustrated in section at 32 in FIGURE 4. This comprises a central portion 34 and integral lobes 36 and 38, with teeth 40 provided in accordance with conventional broaching practices as to spacing, clearances, etc., extending about the entire contour of the broach. As indicated at 42 and 44, the teeth of the broach are formed to produce the wedge-providing flats 30 so that the entire contour of the desired housing bores may be completely finished with one pass of the broach. While a long broach may be desirable for this purpose, extreme accuracy may be secured by pulling the broach vertically upwardly through the housing or housings, thereby avoiding deviations due to sag.

By forming the bores including the tangential wedge-forming flat portions by broaching the clearances between the screws and the cylindrical bore surfaces may be well reduced for complete well-lubricated operation to as little as 0.0012 inch per inch diameter of the idler screws. This is particularly desirable to prevent tilting of the sectional idlers. When tilting is prevented liquids of quite low film strength may be pumped with adequate lubrication by reason of the wedging action referred to.

The invention is also applicable to screw motors having, as is well known, the same construction as screw pumps but operated by liquid under pressure. Here also the wedges are provided at the bore intersections which are approached by the edges of idler screws during their rotation.

It will be evident that various modifications in construction and production methods may be used without departing from the invention as defined in the following claims.

What is claimed is:

1. The method of making a housing for a screw pump or motor of the type having intermeshing screws comprising a power screw having convex threads and at least one idler screw having concave threads and a housing having intersecting cylindrical bores within which said screws rotate, the method comprising forming by extrusion of metal the housing with undersized intersecting approximately cylindrical bores and then simultaneously broaching said bores to finished dimensions by passing therethrough a broach having a multilobed form corresponding to the multilobed form of the intersecting bores.

2. The method of making a housing for a screw pump or motor of the type having intermeshing screws comprising a power screw having convex threads and at least one idler screw having concave threads and a housing having intersecting cylindrical bores within which said screws rotate, with the idler bore having a longitudinally extending surface portion deviating substantially tangentially from its cylindrical surface at the location of its intersection with the power screw bore which is approached by an idler thread moving from the power screw bore during idler rotation, thereby to form a wedge-shaped clearance between the idler screw and its bore, the method comprising forming the housing with undersized intersecting approximately cylindrical bores and then simultaneously broaching said bores to finished dimensions by passing therethrough a broach having a multilobed form corresponding to the multilobed form of the intersecting bores and to the form of said deviating portion.

3. The method of making a housing for a screw pump or motor of the type having intermeshing screws comprising a power screw having convex threads and at least one idler screw having concave threads and a housing having intersecting cylindrical bores within which said screws rotate, with the idler bore having a longitudinally extending surface portion deviating substantially tangentially from its cylindrical surface at the location of its intersection with the power screw bore which is approached by an idler thread moving from the power screw bore during idler rotation, thereby to form a wedge-shaped clearance between the idler screw and its bore, the method comprising forming by extrusion the housing with undersized intersecting approximately cylindrical bores and then simultaneously broaching said bores to finished dimensions by passing therethrough a broach having a multilobed form corresponding to the multilobed form of the intersecting bores and to the form of said deviating portion.

4. The method of making a housing for a screw pump or motor of the type having intermeshing screws comprising a power screw having convex threads and at least one idler screw having concave threads and a housing having intersecting cylindrical bores within which said screws rotate, with the idler bore having a longitudinally extending surface portion deviating substantially tangentially from its cylindrical surface at the location of its intersection with the power screw bore which is approached by an idler thread moving from the power screw bore during idler rotaiton, thereby to form a wedge-shaped clearance between the idler screw and its bore, the method comprising forming the housing with undersized intersecting approximately cylindrical bores and then broaching said bores to finished dimensions including formation by the broaching of said deviating portion.

5. A broach for making a housing for a screw pump or motor of the type having intermeshing screws comprising a power screw having convex threads and at least one idler screw having concave threads and a housing having intersecting cylindrical bores within which said screws rotate, with the idler bore having a longitudinally extending surface portion substantially tangentially outwardly from its cylindrical surface at the location of its intersection with the power screw bore which is approached by an idler thread moving from the power screw bore during idler rotation, thereby to form a wedge-shaped clearance between the idler screw and its bore, said broach having a toothed multilobed form corresponding to the multilobed form of the intersecting bores and dimensioned to produce the finished bores including said deviating portion.

References Cited by the Examiner

UNITED STATES PATENTS

| | | | |
|---|---|---|---|
| Re. 18,458 | 5/1932 | Lundell | 29—95.1 |
| 1,028,036 | 5/1912 | Lee | 29—156.4 |
| 2,642,003 | 6/1953 | Whitfield | 103—128 |
| 2,693,763 | 11/1954 | Sennet | 103—128 |
| 2,724,173 | 11/1955 | Girard | 20—156.4 |
| 2,827,687 | 3/1958 | Avery | 29—95.1 |
| 2,924,181 | 2/1960 | Sennet | 103—128 |
| 2,987,801 | 6/1961 | Psenka | 29—95.1 |

FOREIGN PATENTS 125,797  10/1947  Australia.

JOHN F. CAMPBELL, *Primary Examiner.*

WILBUR J. GOODLIN, WHITMORE A. WILTZ,
*Examiners.*